United States Patent [19]

Collin et al.

[11] Patent Number: 4,576,717
[45] Date of Patent: Mar. 18, 1986

[54] PROCESS FOR DENITRIFYING SUBTERREANEAN WATERS TO MAKE THEM POTABLE

[75] Inventors: Jean J. Collin; Alain Landreau, both of Orléans; Henri Talbo, Rennes; Guy Martin, Cesson Sevigné; Jean Morvan, Liffré, all of France

[73] Assignee: Bureau de Recherches Geologiques et Minieres, Paris, France

[21] Appl. No.: 636,396

[22] Filed: Jul. 31, 1984

[30] Foreign Application Priority Data

Aug. 2, 1983 [FR] France .................. 83 12733

[51] Int. Cl.[4] ............................. C02F 3/06
[52] U.S. Cl. .................. 210/610; 210/616; 210/747; 210/903
[58] Field of Search ............... 210/615–618, 210/610, 630, 605, 747, 903, 150, 151

[56] References Cited

U.S. PATENT DOCUMENTS

| | | | |
|---|---|---|---|
| 3,829,377 | 8/1974 | Hashimoto et al. | 210/903 |
| 3,846,290 | 11/1974 | Raymond | 210/610 |
| 4,039,438 | 8/1977 | Anderson | 210/903 |
| 4,209,390 | 6/1980 | Cabane et al. | 210/903 |
| 4,401,569 | 8/1983 | Jhaveri et al. | 210/747 |
| 4,465,594 | 8/1984 | Laak | 210/903 |

FOREIGN PATENT DOCUMENTS

| | | | |
|---|---|---|---|
| 0086863 | 8/1983 | European Pat. Off. | 210/631 |
| 140031 | 2/1980 | Fed. Rep. of Germany | 210/903 |
| 2302279 | 9/1976 | France | 210/903 |
| 2455002 | 12/1980 | France | 210/903 |
| 59-20399 | 12/1984 | Japan | 210/616 |

Primary Examiner—Thomas Wyse
Attorney, Agent, or Firm—Frost & Jacobs

[57] ABSTRACT

Process for denitrifying subterranean waters to make them potable. The sub-soil is employed as an infiltration site. Wells (3,4), for example four in number, surround a catchment well (5). The wells (3,4) are filled with a mixture based on straw and marl, to permit the denitrification reaction by a heterotrophic route by virtue of the bacteria present in the sub-soil and particularly in the subterranean waters. The denitrified water arrives at the catchment site (5) where it is withdrawn for the distribution (at 7) and for injection (8,9) into the infiltration sites (3,4). A simple, effective and inexpensive process is thus available for making potable the waters from subterranean tables.

14 Claims, 2 Drawing Figures

PROCESS FOR DENITRIFYING SUBTERREANEAN WATERS TO MAKE THEM POTABLE

BACKGROUND OF THE INVENTION

1. Field of the Invention

The present invention relates to the field of the biological treatment of waters and relates most especially to a process for denitrifying water by means of micro-organisms employing carbon-containing substrates (denitrification by a heterotrophic route).

2. Description of the Prior Art

Biological denitrification is a well known process which begins to be applied industrially in the treatment of waters which are to be made potable.

Autotrophic denitrification is carried out in an anoxic medium through the intermediacy of bacteria such as Thiobacillus denitrificans which employ the oxygen from the $NO_3^-$ ion to oxidize the sulfur.

In contrast, the reduction of nitrates by a heterotrophic route requires the presence of a carbon-containing substrate. Industrial lines make use of ethanol or acetic acid as a reducer.

Tests carried out on some soil samples have shown the ability of soil to denitrify waters in the presence of organic substances of vegetable origin, such as lucerne or straw (the use of fresh straw is preferable to that of straw which is already composted).

The composition of the gaseous mixture produced is variable, molecular nitrogen appearing to increase with the quantity of nitrates. In partly submerged soil, in the presence of straw, the disappearance of nitrates is very fast (2 days). In all these tests it appears that the reduction of nitrites is slower and the adaptation time of the micro-organisms is seen as a growth in nitrates at the beginning of the experiment.

In order to valorise the by-products of the agricultural and food industry, studies have already been made on the denitrification of waste water with harvest residues (straw or wood shavings). It has been possible, in this way, to obtain an average reduction of 40% in the $NO_3$ content.

Nevertheless, these earlier experiments have not gone beyond the laboratory stage and, so far as the Applicant is aware, no process has hitherto been proposed which is simple and easy to use, permitting biological denitrification of waters by an in situ treatment, in order to make it possible to make waters from subterranean tables potable. The subject of the invention is such a process, in which the treatment is carried out at the catchment site of the potable water.

The patents FR-A-2,302,279 and DD-A-140,031 may be mentioned as documents illustrating the prior art in the field of the denitrification of waters.

Patent FR-A-76/05628 relates to a process for removing the nitrogen compounds present in the water, and for this purpose proposes to make use of the micro-organisms intended for the denitrification of the waters, these micro-organisms being capable of being introduced into the soil. In such a process, the denitrifying micro-organisms are introduced into the water to be treated. Similarly, the latter has added to it a liquid nutritive carbon-containing substance, for example a solution of glucose, the water to be introduced into the soil being moreover made alkaline by means of an alkali metal hydroxide, in the case where the soil has an acid reaction. It should also be noted that the denitrifying mixture is introduced directly into the aquifer. The denitrification reaction is therefore produced within the aquifer itself. Patent FR-A-76/05,628 therefore describes a denitrification process which makes use of the sub-soil as a reaction environment, but which does not make it possible to make the water potable, that is to say to obtain a water whose chemical composition conforms to the potability standards. Furthermore, the micro-organisms or bacteria which can be used for the denitrification are introduced with the water, which therefore requires an artificial enrichment with denitrifying bacteria of the water to be treated.

Patent DD-A-140,031 relates to the denitrification of stagnant waters originating, for example, from lakes and ponds. The process described in this patent consists in installing a denitrification reactor at the bottom of the water. This reactor contains a support for the bacteria, for example straw. The latter is used as a filling material and not as a carbon-containing substance which is nutritive for the micro-organisms, this substance being a liquid substance introduced with the water. Moreover, patent DD-A-140,031 suggests the replacement of the body filling the reactor by a biologically inert material. There is no teaching in this prior document of a process which makes it possible to treat subterranean waters directly to obtain a potable water by making direct use of the micro-organisms or bacteria present in the sub-soil, and without it being necessary to employ a reactor situated in the sub-soil.

GENERAL DESCRIPTION OF THE INVENTION

The present invention relates to a process for biological denitrification by means of micro-organisms of the heterotrophic type, using a carbon-containing substrate. It relates to a process for denitrifying subterranean waters in order to make them potable, the objective to be attained being not only to reduce the concentration of nitrates in the waters pumped into the aquifer medium but also to ensure that the water extracted from its environment conforms to the potability standards for human consumption. The potability requirements make it necessary to remove the undesirable organic compounds which are formed during the denitrification reaction employing biological and heterotrophic routes.

The subject of the invention is such a process without it being necessary to have recourse to an artificial enrichment with denitrifying bacteria.

The objectives of the invention are obtained in a simple manner, by a process which makes use of the characteristics of the sub-soil.

The invention thus relates to a process for biological denitrification of subterranean waters by a heterotrophic route, in order to make them potable, in which the waters to be treated are introduced into infiltration sites and at least partial use is made of the sub-soil as a reaction zone, the treated water being captured in the aquifer table, wherein the denitrification reaction is carried out without recourse to an artificial enrichment with denitrifying bacteria, wherein the denitrification reaction is carried out before the injection into the aquifer table, by conveying into the latter the denitrified waters originating from the reaction zone, after these have passed through a layer of sub-soil or of an artificial material separating the reaction zone from the aquifer table and wherein, after passing over the infiltration sites, the denitrified water is injected into the non-saturated zone close to the catchment of the waters which are sent for distribution, which permits a supplementary purification of the denitrified water, the captured water being potable without other treatment.

The process of the invention may be used in various ways. It can be applied, most advantageously, to waters having high nitrate contents, such as subterranean waters. Thus, the process of the invention finds a particularly advantageous application for making the waters in subterranean tables potable.

According to the essential feature of the invention, the sub-soil itself is employed, at least in part, as a reaction zone for the biological denitrification. Thus, the treatment may be carried out wholly in the sub-soil itself, or only partly in the latter; in this latter case, a part of the reaction is carried out outside the soil, for example in a trough or an external column, the percolation being carried out upwards or downwards.

However, the preferred embodiment of the invention consists in employing the sub-soil to form the greatest possible part of the reaction zone. In some cases, however, the aquifer table is very close to the ground, with the result that the path separating the latter from the table is insufficient to form a reaction zone providing a satisfactory denitrification of the water to be treated. In such a case, it may become necessary to extend the reaction zone outside the soil, as was said earlier. However, in many cases, the height separating the ground from the aquifer table is sufficient for the denitrification reaction to take place.

According to the invention, infiltration sites are produced by forming tanks or wells, the distribution and number of which should be adapted to local conditions. Account must be taken, in fact, of the nature of the sub-soil, of that of the aquifer table, of the rate of flow of water in the sub-soil, and other parameters known to the expert. Thus, while the process of the invention can in principle be operated with one infiltration well, practical circumstances impose a number of wells or tanks which is greater than 1 and, in general equal to 2, 3, 4 or more.

In other respects, the treated water from the aquifer table is captured in a known manner. After passing over the infiltration sites, the denitrified water is injected into the aquifer environment close to the catchment location for the waters conveyed for distribution. According to the hydrogeological conditions, this re-injection will be carried out either directly into the aquifer, or into the non-saturated zone, which will permit a supplementary purification of the denitrified water, particularly in respect of the residual organic compounds.

The dimensions of the infiltration sites, their number and their location relative to the main catchment are a function of the operating conditions which are required for proper operation of the process and of the hydrogeological and hydrodynamic characteristics of the subterranean water table.

In general, it is advantageous that the catchment be close to the outlet of the infiltration wells. A suitable configuration consists in employing a central catchment surrounded by infiltration wells, arranged in a uniform manner around it, and for example 3 or 4 in number.

It is not necessary that the same catchment well serves to distribute and to re-inject the water to feed the infiltration wells. Nevertheless, in this embodiment, which is simple, the water is captured in a single withdrawal zone to be partly re-directed for distribution, while the remainder is employed for the injection, for the purpose of re-treatment. As an alternative, provision can be made for a catchment structure for the distribution and another structure in which the captured water is re-injected into the infiltration sites.

When hydrogeological conditions permit, particularly when the table level, during a high water period, is not too close to the surface of the ground, all of the treatment is carried out in the sub-soil, and it is therefore appropriate to prepare the infiltration wells in order to permit the heterotrophic denitrification reaction.

For this purpose, the process of the invention makes use of the teaching of the prior art, but adapting it to the conditions under which the process is applied. Thus, it is of great importance to note that, according to the invention, there is no artificial enrichment with denitrifying bacteria. The latter develop independently; in fact, the denitrifying environment employed promotes the development of denitrifying bacteria which are potentially present in the majority of subterranean tables. Consequently, the use of the sub-soil as a reaction zone yields results which are extremely advantageous.

The latter are also obtained by virtue of the fact that the water flow takes place naturally in the sub-soil at a slow rate, for example of the order of 0.5 m/h, which makes an extensive denitrification of the water to be treated possible.

The denitrification reaction according to the invention requires the presence of a carbon-containing substrate. The carbon-containing substance employed for this purpose consists of biodegradable solid hydrocarbonaceous materials. For this purpose, it will be possible to use for example, some byproducts of the agricultural and food industry, harvest residues such as straw, or wood shavings. The best results have been obtained using straw.

In addition, the reaction is carried out in the presence of an inorganic support. The nature of the latter varies depending on the sub-soil characteristics. If, after the infiltration wells have been dug, it is found that the terrain offers, at least partly, characteristics which are suitable for the inorganic support, the filling earth may be re-employed by being mixed with carbon-containing organic material, such as straw. In many cases, however, it is appropriate to enrich the soil and sometimes even to renew completely the natural sub-soil from the infiltration wells. It is, in fact, preferable to select an inorganic support which provides the most satisfactory results from the physico-chemical stand-point. Insofar as the physical form is concerned, preference is given to a mixture containing sand. Because of chemical considerations, it is advantageous to employ a mixture containing a ground carbonate-containing rock which makes it possible to buffer the environment which tends to become acidic during the denitrification reaction; this correction of the environmental pH makes it possible to avoid a premature drop in the reaction yield. In a preferred embodiment, marl has been employed as a carbonate-containing substance (sand consisting of components of skeletons of various shellfish). Apart from its buffering power, marl, as a result of its high porosity, provides numerous fixation sites for denitrifying bacteria.

It will be obvious to the expert that is it possible to make use of a great variety of combinations of carbon-containing substances and inorganic support. According to the invention, the best results have been obtained with the combination of straw and marl. It was found, in fact, that this combination offered the best denitrification power while providing the optimum pH for the development of the denitrifying bacteria. Furthermore, straw is an abundant and very cheap carbon-containing substance.

It goes without saying that it is appropriate to renew the contents of the infiltration wells periodically. For example, water under pressure may be injected for this purpose into the bottom part of the well. The used filling material is thus removed from the top part of the well, and is thereupon replaced with a new filling product.

Since the denitrification reaction by a heterotrophic route results in the production of derivatives including organic compounds, it is important that the denitrified water undergoes an additional purification by passing through any substance capable of effecting the removal of these compounds. In this connection it has already been noted that re-injection of the water into the non-saturated zone, outside the aquifer table, makes it possible to effect this additional purification in a very simple manner, by nearly taking advantage of the characteristics of the sub-soil. In other circumstances, and particularly when a part of the reaction is carried out outside the ground, it may become necessary to make use of additional substances, of the activated charcoal type, for example, which are known to the expert.

The various components of the mixture (straw, sand, marl, activated charcoal if appropriate) may be employed in proportions which can vary within wide limits according to the chosen operating parameters and the fixed constraints (supply flow rates, percolation rate, nitrate concentration, target yield aimed at, and the like).

All these controlling and monitoring operations are available to the expert and do not depart from the scope of the present invention.

DESCRIPTION OF PREFERRED EMBODIMENT

In its preferred form, the invention offers a process for denitrification in situ with re-injection of the denitrified water into the table, employing:

- a carbon-containing substrate of natural origin, such as straw,
- an inorganic support, preferably marl, having a pH buffering power which has a corrective effect on water quality,
- the ability of the terrain to act as filter for purifying the water, which makes it possible to remove organic compounds capable of being formed during the denitrification reaction,
- a low rate of filtration (a few tens of cm/h) permitting better accommodation of minor flow-rate variations which are detrimental from the point of view of the denitrification yield,
- the sub-soil as a filtration site permits a constant temperature to be maintained without expenditure of energy. The bacteria are highly sensitive to temperature differences, which results in the production of a temporary drop in the reaction yield. The invention does not have this disadvantage.

Another advantage of such a process which will also be noted is that the residual product of the denitrification (carbonate+lignin) is a non-polluting residue which can be reused in agriculture.

The process thus offers advantages which are wholly decisive, to which should be added the simplicity of its utilization.

BRIEF DESCRIPTION OF THE DRAWINGS

The invention will now be illustrated without being in any way restricted by the description which follows, with reference to the attached drawings, in which.

DETAILED DISCLOSURE OF THE INVENTION

Figure 1:
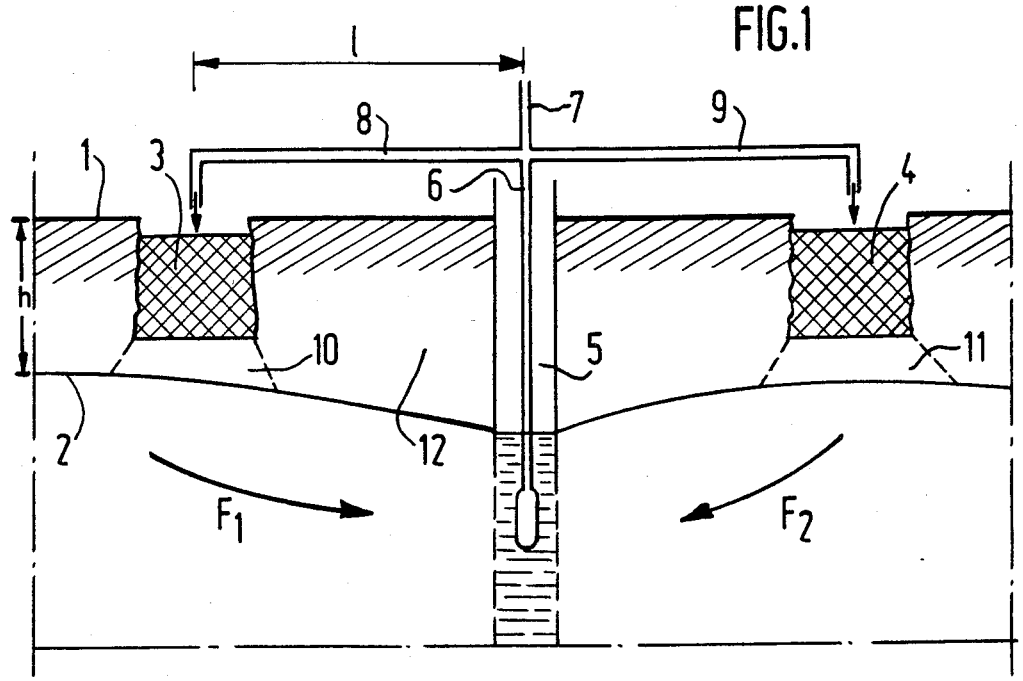
FIG. 1 shows an elevation-section illustrating diagramatically a plant for the use of the process of the invention.

FIG. 1 shows diagramatically an underground plant for using the process of the invention. This choice is preferably made when the height h separating the surface of the ground (1) and the level of the subterranean table (2) is sufficient, in other words, when the level of the table (2) in a high water period is not located too near the surface (1).

According to the invention, a number of infiltration wells (3,4) are provided. In the example of embodiment shown these wells are four in number, and arranged uniformly around a central catchment well (5). After having been dug, the various wells (3,4) are filled with a mixture which makes it possible to ensure denitrification and which essentially comprises a carbon-containing substrate, preferably straw, and an inorganic support, preferably sand and/or marl. The catchment well (5) is constructed in the usual manner. The structure (5) incorporates pipework (6) which serves for withdrawing the water which has been rendered potable. This water may be employed directly for distribution via the pipework (7). Branches (8,9) permit the wells (3,4) to be supplied. The nonsaturated zone is shown as (12). The water to be treated passes over the infiltration sites (3,4) then into the infiltration cones (10,11) which may themselves form a saturated zone depending on the experimental conditions and the nature of the sub-soil. The presence of these zones (10,11) is favorable to ensure a supplementary removal of the organic matter remaining in the denitrified water. The path of the denitrified water leading to the catchment structure (5) is shown by the arrows (F1,F2).

Figure 2:
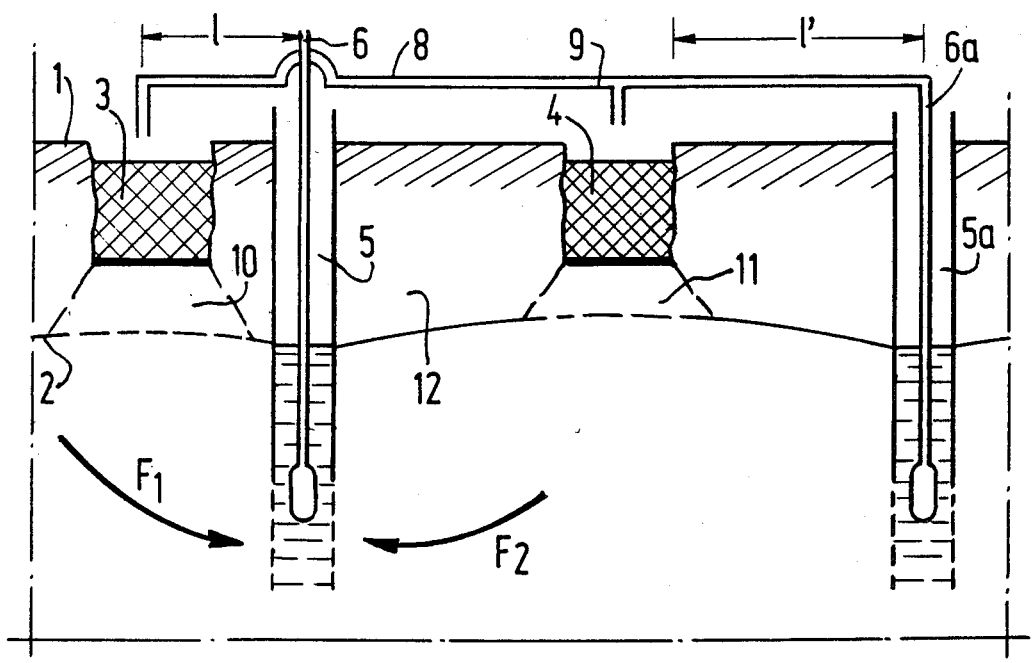
FIG. 2 is a view similar to FIG. 1, illustrating an alternative form of embodiment of the process.

In the alternative form shown in FIG. 2, the same reference marks designate the same components as in FIG. 1. The difference lies in that there are two catchment structures, one (5) intended for the direct distribution of the water which has been rendered potable, at (6), and the other (5a) permitting other infiltration sites (3,4) to be supplied via pipework (6a) and branches (8,9).

In accordance with the embodiment of FIG. 2, it is appropriate to avoid, on the one hand, cross-interference of the pumping of the wells 5 and 5a and, on the other hand, a part of the denitrified waters which originate from the zones 10 and 11 returning to the well 5a. To this end, the distance l' is chosen to be very much greater than l, so that the wells 5 and 5a are distant from each other. Thus the well 5a is arranged outside the infiltration sites 3 and 4.

It goes without saying that other configurations may be adopted by the expert, depending on the existing hydrogeological constraints. Thus, the choice of the number of infiltration sites, their dimensions and their location relative to the main catchment (see distance l in FIG. 1) is within the skill of the expert, on account of the local sub-soil characteristics, and the required process parameters.

It will be noted that the process of the invention is simple to utilize. The amount of energy required by the treatment is very small. From the point of view of environmental protection, the process is also highly favorable, since the natural site is preserved, all of the operations being carried out underground. The capital costs are reduced and the operating cost is very low, since there is no need to use chemical reagents, the denitrification being carried out by a heterotrophic route by the denitrifying bacteria present in the sub-soil.

It will also be noted that the material employed, for example the mixture of straw and marl which has been used in the reaction, may be employed in agriculture, as a chalky and organic conditioner. This valorization of the spent material forms an additional advantage of the process of the invention.

The process of the invention will be further illustrated by the following examples. These have been obtained under experimental conditions simulating the actual conditions which exist in the sub-soil.

EXAMPLE 1

In this example, the conditions existing in the sub-soil were simulated by using a column 1.30 m in height and 60 mm in diameter filled with a mixture of sand and straw, containing 10% by weight of straw, namely 200 g of chopped straw and 2 kg of sand. The water flow was equal to approximately 500 ml/h.

An upward percolation at a velocity of approximately 20 cm/h was employed. Water temperature varied between 12° C. and 20° C. depending on the ambiant weather conditions. The trial was divided into three separate periods. The results obtained during denitrification are shown in Table 1. The concentrations shown in the Table correspond, for the period in question, to the average value calculated from the measured daily concentrations.

TABLE 1

| Period | Mean nitrate concentration at column entry (in mg/l) | Mean nitrate concentration at column outlet (in mg/l) |
|---|---|---|
| from 31.01.83 to 18.02.83 | 90 | 6 |
| from 31.02.83 to 11.03.83 | 85 | 2 |
| from 14.03.83 to 01.04.83 | 105 | 27 |

EXAMPLE 2

A column and experimental conditions which were identical to those of Example 1 were employed, but the mixture of sand and straw was replaced with a mixture of marl and straw, namely with 185 g of chopped straw and 1.4 kg of marl. The results obtained are collated in Table II, the measurements having been carried out as in Example 1.

TABLE II

| Period | Mean nitrate concentration at column entry (in mg/l) | Mean nitrate concentration at column outlet (in mg/l) |
|---|---|---|
| from 14.03.83 to 30.03.83 | 106 | 11 |
| from 01.04.83 to 15.04.83 | 90 | 2 |
| from 18.04.83 to 06.05.83 | 104 | 18 |

EXAMPLE 3

A column and experimental conditions which were identical to those of Example 1 were employed, but the mixture of sand and straw was replaced with a mixture of peat and sand containing 50% by weight of peat, namely 400 g of peat and 400 g of sand. The results obtained are collated in Table III, the measurements having been made as in Example 1.

TABLE III

| Period | Mean nitrate concentration at column entry (in mg/l) | Mean nitrate concentration at column outlet (in mg/l) |
|---|---|---|
| from 21.02.83 to 11.03.83 | 90 | 89 |
| from 14.03.83 to 01.04.83 | 100 | 99 |
| from 05.04.83 to 22.04.83 | 90 | 85 |

EXAMPLE 4

A column and experimental conditions which were identical to those of Example 1 were employed, but the mixture of sand and straw was replaced with a mixture of sand and iron sulfide, containing 50% by volume of iron sulfide, namely 350 cm$^3$ of iron sulfide and 350 cm$^3$ of sand. The results obtained are collated in Table IV, the measurements having been made as in Example 1.

TABLE IV

| Period | Mean nitrate concentration at column entry (in mg/l) | Mean nitrate concentration at column outlet (in mg/l) |
|---|---|---|
| from 05.04.83 to 22.04.83 | 89 | 73.6 |
| from 25.04.83 to 20.05.83 | 100 | 76 |
| from 24.05.83 to 10.06.83 | 94 | 28 |

From the above examples it follows that the mixtures of Examples 1 and 2, sand-straw and sand-marl respectively, give the best denitrifaction results. In particular, it will be noted that, in Example 2, the sand-marl mixture yields, at the end of the 3rd period, a denitrification efficiency of 83% while the sand-straw mixture of Example 1 yields an efficiency of only 74%. The sand-marl mixture is therefore preferred.

Moreover an experimental device has been built.

Denitrification trials of subterranean waters have been made on an alluvial table. The test device was as follow:
- a central drilling or well in which the flow rate is about 3 m$^3$/h
- three reactors or infiltration sites filled with a denitrifying mixture consisting in chopped straw and marl
- three infiltration cones, each cone being associated to a reactor or infiltration site.

Each reactor as well as each infiltration cone associated to said reactor, are provided at 15 meters from the central well. In the present experiment the reactors are outside the soil and are constituted by tanks filled with 1 m³ of the denitrifying mixture. Water rate circulating upwards through the mixture is 0.3 m³/h. The surface of each infiltration cone is 1 m².

The results obtained during a running period of a month with the device are as indicated hereinbelow.

INITIAL STATE

Nitrate concentration measured on the water of the central well was 60 mg/l

|  | Water temperature | pH | resistivity (Ω × cm at 20° C.) | Nitrates (mg/l) | Nitrates (mg/l) | Ammoniacal nitrogen (mg/l) | Organic materials mg/l oxydation with potassium permanganate |
|---|---|---|---|---|---|---|---|
| After a running period of ten days |  |  |  |  |  |  |  |
| Central well | 11°6 | 5.3 | 4 444 | 48.5 | 0.03 | 0.1 | 0.125 |
| mean content calculated at the outlet of the three reactors | 9°5 | 7.4 | 2 100 | 7 | 0.6 | 0.1 | 13.8 |
| intermediate control piezometer (1) |  | 6.3 | 3 450 | 40 | 0.18 | — | 1.65 |
| water characteristics of the table (2) |  | 5.6 | 4 000 | 52 | 0.09 | — | 0.2 |
| After a running period of twenty days |  |  |  |  |  |  |  |
| Central well | 11°4 | 5.4 | 4 000 | 42.5 | 0.05 | 0.5 | 0.05 |
| mean content calculated at the outlet of the three reactors | 9°5 | 7.15 | 1 950 | 7 | 0.55 | 0.2 | 7 |
| intermediate control piezometer (1) | 10°3 | 5.7 | 3 570 | 41 | 0.13 | 0.3 | 0.1 |
| water characteristics of the table (2) | 10° | 5.35 | 3 770 | 49 | 0.16 | 0.5 | 0.1 |
| After a running period of thirty days |  |  |  |  |  |  |  |
| Central well | 12°5 | 5.55 | 3 570 | 53 | 0.02 | 0.02 | 0 |
| mean content calculated at the outlet of the three reactors | 12°3 | 7.15 | 1 830 | 23 | 1.5 | 0.02 | 5 |
| intermediate control piezometer (1) | 10°8 | 6.20 | 2 860 | 51 | 0.35 | 0.05 | 0 225 |
| water characteristics of the table (2) | 16°1 | 5.6 | 3 230 | 62 | 0.05 | 0.05 | 0 |

(1) structure situated between an infiltration cone and the central well at 10 meters from said well
(2) measured on a structure situated upstream of the central well at about 50 meters from said well.

We claim:

1. A process for biological denitrification by a heterotrophic procedure for rendering subterranean water potable, said process comprising: introducing water to be treated into an in situ infiltration site containing a carbonaceous substrate and an inorganic support to denitrify the water to be treated, wherein denitrification is carried out without recourse to artificial enrichment with denitrifying bacteria; passing said denitrified water from said infiltration site to a zone which serves as a supplementary purification, said zone including means to remove residual organic compounds to produce potable water; and passing said potable water into an aquifer cable thus rendering said aquifer table potable.

2. The process as claimed in claim 1, wherein said treated water is subterranean water.

3. The process as claimed in either of claims 1 and 2, wherein a part of the denitrification is carried out underground, and a part of the denitrification is carried out above the ground, in a trough or an external column for percolation.

4. The process as claimed in either of claims 1 and 2, wherein a part of the denitrification reaction is carried out underground, in which case a part of the reaction is carried out outside the ground, for example in a trough or an external column for percolation.

5. The process as claimed in claim 1 wherein said infiltration site is produced by forming one or more tanks or wells, whose distribution, number and dimension are adapted to the local conditions.

6. The process as claimed in claim 5, further including the step of capturing said potable water in a central catchment surrounded by said infiltration wells distributed uniformly around it.

7. The process as claimed in claim 1, further including the steps of capturing said potable water in a single withdrawal zone to be diverted partly for distribution while the remainder is recycled for retreatment in said infiltration site.

8. The process as claimed in claim 1, further including the step of capturing said potable water in a first catchment structure for the distribution thereof, and a second catchment structure in which the water captured is recycled into the infiltration site.

9. The process as claimed in claim 1, wherein the carbonaceous substrate is a biodegradable solid hydrocarbonaceous material capable of providing the carbon required for the heterotrophic denitrification.

10. The process as claimed in claim 9, wherein the carbonaceous substrate originates from byproducts of the agricultural and food industry, said byproducts including harvest residues, straw or wood shavings.

11. The process as claimed in claim 1, said carbonaceous substrate and inorganic support are straw and marl, respectively.

12. The process as claimed in claim 1, wherein low velocities of filtration, of the order of a few tens of cm/hour are employed.

13. The process as claimed in claim 1, wherein the carbonaceous substrate and inorganic support of the infiltration site are renewed periodically by removing and replacing the spent carbonaceous substrate and inorganic support.

14. The process as claimed in claim 13, wherein in order to remove the contents of the infiltration site, water under pressure is injected into the bottom part of the site to float the spent carbonaceous substrate and inorganic support to the top part of the site, whereupon the spent carbonaceous substrate and inorganic support are removed and replaced.

* * * * *